US012767047B2

(12) United States Patent
Laserra Lima et al.

(10) Patent No.: US 12,767,047 B2
(45) Date of Patent: Oct. 20, 2026

(54) LIGHTING CONTROL SYSTEM FOR MITIGATING EXTERIOR LIGHT FAILURES

(71) Applicant: GM GLOBAL TECHNOLOGY OPERATIONS LLC, Detroit, MI (US)

(72) Inventors: Thiago Laserra Lima, Sterling Heights, MI (US); Matthew John Van Vleet, Ferndale, MI (US); Sitaram Emani, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 55 days.

(21) Appl. No.: 18/925,445

(22) Filed: Oct. 24, 2024

(65) Prior Publication Data

US 2026/0116295 A1 Apr. 30, 2026

(51) Int. Cl.

*B60Q 11/00* (2006.01)
*B60Q 1/14* (2006.01)
*B60Q 1/20* (2006.01)
*B60Q 1/22* (2006.01)
*B60Q 1/34* (2006.01)
*B60Q 1/44* (2006.01)
(Continued)

(52) U.S. Cl.

CPC .............. *B60Q 11/007* (2013.01); *B60Q 1/14* (2013.01); *F21S 43/14* (2018.01); *H05B 45/20* (2020.01); *H05B 47/29* (2020.01); *B60Q 1/20* (2013.01); *B60Q 1/22* (2013.01); *B60Q 1/34* (2013.01); *B60Q 1/44* (2013.01); *B60Q 2400/20* (2013.01); *F21S 41/141* (2018.01); *F21W 2102/30* (2018.01); *F21W 2103/20* (2018.01); *F21W 2103/35* (2018.01); *F21W 2103/45* (2018.01)

(58) Field of Classification Search

CPC .......... B60Q 11/007; B60Q 1/14; B60Q 1/20; B60Q 1/22; B60Q 1/34; B60Q 1/44; B60Q 2400/20; F21S 43/14; F21S 41/141; H05B 45/20; H05B 47/29; F21W 2102/30; F21W 2103/20; F21W 2103/35; F21W 2103/45

See application file for complete search history.

(56) References Cited

FOREIGN PATENT DOCUMENTS

DE 19818114 A1 11/1999
DE 102004042108 A1 3/2006
(Continued)

OTHER PUBLICATIONS

Translation_KR20230029373 (Year: 2023).*
(Continued)

*Primary Examiner* — Renan Luque

(57) ABSTRACT

A lighting system includes at least two indicating lights each supporting primary and secondary lighting functions. The at least two indicating lights are selected from a group consisting of a turn signal light, a brake light, and a reverse light. A diagnostic module determines when a first one of the at least two indicating lights is not operating. A lighting control module is configured to control a second one of the at least two indicating lights to support the primary lighting function when the first one of the at least two indicating lights is operating and the primary lighting function is commanded and to adjust operation of the second one of the at least two indicating lights to support the secondary lighting function corresponding to the first one of the at least two indicating lights when the first one of the at least two indicating lights is not operating.

20 Claims, 6 Drawing Sheets

(51) Int. Cl.

| | |
|---|---|
| ***F21S 41/141*** | (2018.01) |
| ***F21S 43/14*** | (2018.01) |
| ***F21W 102/30*** | (2018.01) |
| ***F21W 103/20*** | (2018.01) |
| ***F21W 103/35*** | (2018.01) |
| ***F21W 103/45*** | (2018.01) |
| ***H05B 45/20*** | (2020.01) |
| ***H05B 47/29*** | (2020.01) |

(56) References Cited

FOREIGN PATENT DOCUMENTS

| | | | | | |
|---|---|---|---|---|---|
| DE | 102023100603 | A1 | | 7/2024 | |
| EP | 813995 | A2 | | 12/1997 | |
| KR | 20230029373 | A | * | 3/2023 | ............. H05B 45/44 |
| WO | WO-2023033138 | A1 | * | 3/2023 | ............... B60Q 1/00 |

OTHER PUBLICATIONS

Translation_WO2023033138 (Year: 2023).*
German Office Action from counterpart DE1020241370807, dated Apr. 25, 2025.

* cited by examiner

LIGHTING CONTROL SYSTEM FOR MITIGATING EXTERIOR LIGHT FAILURES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to lighting control systems for vehicles, and more particularly to lighting control systems for mitigating failures of exterior lights of vehicles.

Vehicles include front and rear lighting systems including headlights, fog lights, turn signals, brake lights, and reverse lights. The headlights include low beam and high beam headlights. The turn signals, brake lights, and reverse lights provide other motorists with visual indications of braking, reversing, or turning of the vehicle to increase driving safety.

SUMMARY

A lighting system for a vehicle includes at least two indicating lights each supporting a primary lighting function and a secondary lighting function. The at least two indicating lights are selected from a group consisting of a turn signal light, a brake light, and a reverse light. A diagnostic module is configured to determine when a first one of the at least two indicating lights is not operating. A lighting control module is configured to control a second one of the at least two indicating lights to support the primary lighting function when the first one of the at least two indicating lights is operating and the primary lighting function is commanded and to adjust operation of the second one of the at least two indicating lights to support the secondary lighting function corresponding to the first one of the at least two indicating lights when the first one of the at least two indicating lights is not operating.

In other features, the lighting control module is configured control the second one of the at least two indicating lights to support both the primary lighting function and the secondary lighting function when the primary lighting function is commanded while the first one of the at least two indicating lights is not operating. The at least two indicating lights include red, green, and blue (RGB) light emitting diodes (LEDs). The lighting control module is configured to change a color of the second one of the at least two indicating lights when supporting the secondary lighting function. The lighting control module is configured to adjust a second color of the second one of the at least two indicating lights to match a first color of the first one of the at least two indicating lights when supporting the secondary lighting function.

In other features, the lighting control module is configured to adjust animation of the second one of the at least two indicating lights when supporting the secondary lighting function. The lighting control module is configured to adjust animation of the second one of the at least two indicating lights to match animation of the first one of the at least two indicating lights when supporting the secondary lighting function. When the diagnostic module determines that the second one of the at least two indicating lights is also not operating, the lighting control module adjusts operation of a third one of the turn signal light, the brake light, and the reverse light to support the secondary lighting function of the first one of the at least two indicating lights.

In other features, the second one of the at least two indicating lights includes an array of light emitting diodes, a first portion of the light emitting diodes is configured to support the primary lighting function, and a second portion of the light emitting diodes is configured to support one of the primary lighting function when the first one of the at least two indicating lights is operating and the secondary lighting function when the first one of the at least two indicating lights is not operating.

In other features, the second portion of the light emitting diodes include red, green, and blue (RGB) light emitting diodes (LEDs), and the first portion and the second portion of the light emitting diodes are separated by a light separating member.

In other features, a high beam headlight is arranged on one of a driver side and a passenger side of the vehicle. A low beam headlight is arranged on the one of the driver side and the passenger side of the vehicle. The diagnostic module is configured to determine when the high beam headlight is not operating. The lighting control module is configured to adjust at least one of an intensity and a height of one of the low beam headlight when the high beam headlight is not operating.

In other features, a fog light is arranged on the one of the driver side and the passenger side of the vehicle. The lighting control module is configured to illuminate the fog light when the low beam headlight and the high beam headlight are not operating.

A lighting system for a vehicle includes a turn signal light on one of a driver side and a passenger side of the vehicle, a brake light on the one of the driver side and the passenger side of the vehicle, and a reverse light on the one of the driver side and the passenger side of the vehicle. A diagnostic module is configured to determine when at least a first one of the turn signal light and the brake light is not operating. A lighting control module is configured to control the brake light to support a turn signal lighting function when the turn signal light is not operating, control the turn signal light to support a brake signal lighting function when the brake light is not operating, control the reverse light to support the brake signal lighting function when the turn signal light and the brake light are not operating, and control the reverse light to support the turn signal lighting function when the turn signal light and the brake light are not operating.

In other features, the lighting control module is configured to support both a primary lighting function and a secondary lighting function of the turn signal light, the brake light, and the reverse light when the primary lighting function of the turn signal light, the brake light, and the reverse light is needed while the turn signal light, the brake light, and the reverse light are supporting the secondary lighting function.

In other features, the turn signal light, the brake light, and the reverse light include red, green, and blue (RGB) light emitting diodes (LEDs). The lighting control module is configured to change a color of one of the turn signal light, the brake light, and the reverse light when supporting a secondary lighting function. The lighting control module is configured to adjust animation of one the turn signal light, the brake light, and the reverse light when supporting a secondary lighting function.

In other features, at least one the turn signal light, the brake light, and the reverse light includes an array of light emitting diodes, a first portion of the light emitting diodes is configured to support a primary lighting function, and a second portion of the light emitting diodes is configured to support the primary lighting function or a secondary lighting function.

A front lighting system for a vehicle includes a first high beam headlight on a driver side of the vehicle, a second high beam headlight on a passenger side of the vehicle, a first low beam headlight on the driver side of the vehicle, and a second low beam headlight on the passenger side of the vehicle. A diagnostic module is configured to determine when at least one of the first high beam headlight and the second high beam headlight is not operating. A lighting control module is configured to adjust at least one of an intensity and a beam height of one of the first low beam headlight and the second low beam headlight on a same side of the vehicle as the at least one of the first high beam headlight and the second high beam headlight that is not operating.

In other features, the vehicle includes a first fog light on the driver side of the vehicle and a second fog light on the passenger side of the vehicle. The lighting control module is configured to illuminate at least one of the first fog light and the second fog light on a same side of the vehicle as the at least one of the first high beam headlight and the second high beam headlight when the one of the first low beam headlight and the second low beam headlight is not operating.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Vehicles typically include diagnostic systems that diagnose when one or more of the headlights, fog lights, turn signals, brake lights, and/or reverse lights are not operating. When the diagnostic system detects an illumination failure of a first light, a lighting control system according to the present disclosure adapts a second or third light to support a secondary lighting function corresponding to the failed first light. For example, when a brake light or turn signal fails, the turn signal or brake light, respectively, can be used to support the failed light. Additional failure modes and mitigating actions are described further below.

Figure 1:
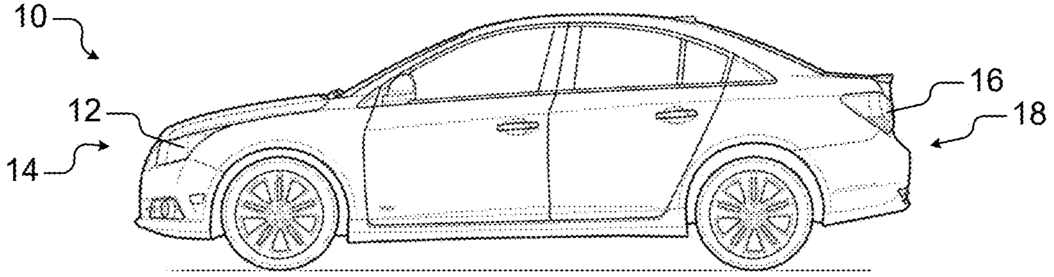
FIG. 1 is a side view of an example of a vehicle including a front lighting system and a rear lighting system according to the present disclosure.

Referring now to FIG. 1, a vehicle 10 includes a front lighting system 12 arranged adjacent to or integrated with a front surface 14 of the vehicle 10. The front lighting system 12 typically includes headlights and/or fog lights for forward illumination of a vehicle path. The vehicle 10 includes a rear lighting system 16 arranged adjacent to or integrated with a rear surface 18 of the vehicle 10. The rear lighting system 16 typically includes turn signals, brake lights, and/or reverse lights.

Figure 2A:
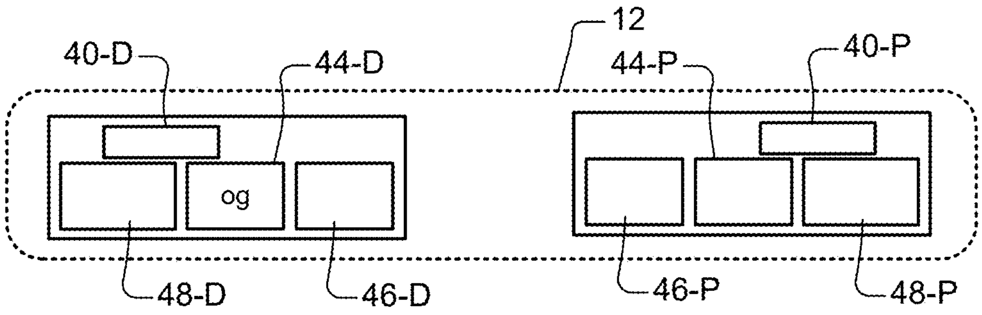
FIG. 2A is a functional block diagram of an example of the front lighting system of FIG. 1.
Figure 2B:
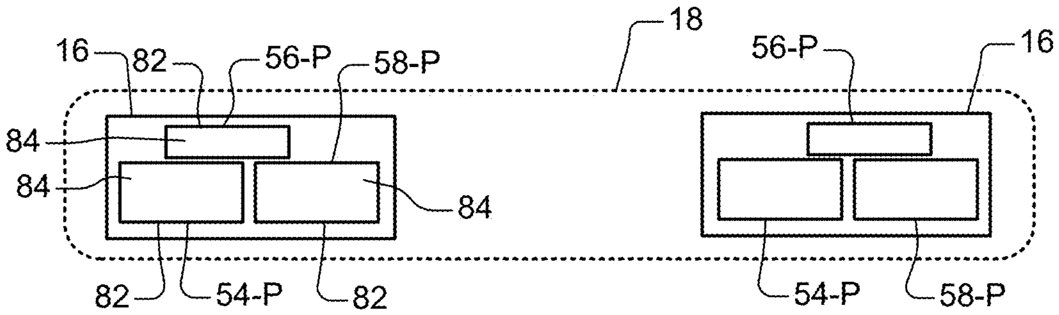
FIG. 2B is a functional block diagram of an example of the rear lighting system of FIG. 1.

Referring now to FIGS. 2A and 2B, examples of the front lighting system 12 and the rear lighting system 16 are shown, respectively. In FIG. 2A, the front lighting system 12 includes a low beam light 48, a turn signal 40, a fog light 44, and/or a high beam 46 on driver (-D) and passenger (-P) sides of the vehicle 10. In some examples, the low beam light 48 has an adjustable intensity and/or height.

In FIG. 2B, the rear lighting system 16 includes a reverse light 54, a turn signal 56, and/or a brake light 58 on driver (-D) and passenger (-P) sides of the vehicle 10. As can be appreciated, some vehicles may combine two or more functions using a single light. For example, braking and turn signals can be combined. In some examples, each of the reverse light 54, the turn signal 56, and/or the brake light 58 includes a light enclosure 82 to separate different colored light and a lens 84 to focus the light.

Figure 3:
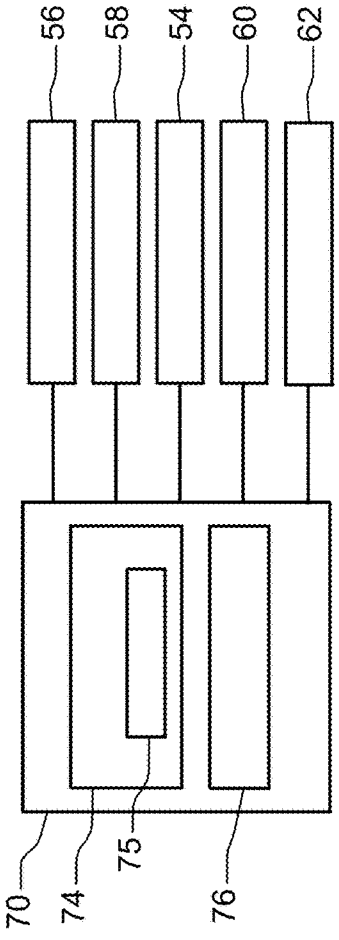
FIG. 3 is a functional block diagram of an example of a controller including a lighting control module for controlling the front and/or rear lighting systems according to the present disclosure.

Referring now to FIG. 3, a controller 70 includes a diagnostic module 74 configured to diagnose failures of external lights of the vehicle. For example, the diagnostic module 74 may include a sensor 75 to sense a parameter such as a voltage, current or resistance sensor of the corresponding light. The diagnostic module 74 uses the parameter to diagnose illumination failures. When the problem is diagnosed, the diagnostic module 74 sets a diagnostic code and/or alerts the driver. The controller 70 further includes a lighting control module 76 configured to alter operation of one or more other lights in the front lighting system or the rear lighting system when one of the lights in the front lighting system or the rear lighting system, respectively, is not functioning.

Figure 4:
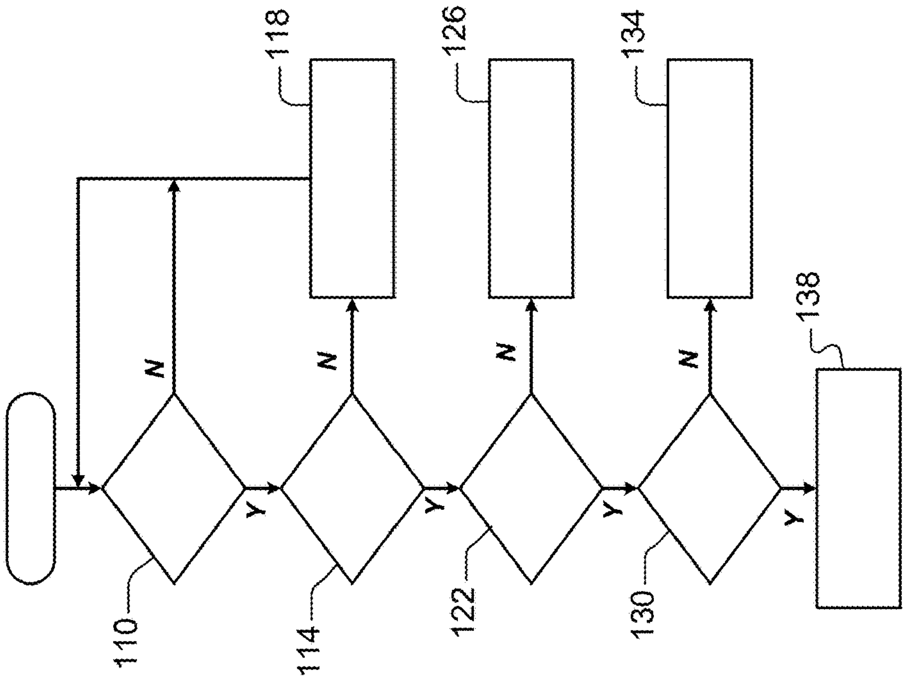
FIG. 4 is a flowchart of an example of a method for controlling the front and/or rear lighting systems according to the present disclosure.

Referring now to FIG. 4, a method for operating the lighting system is shown. At 110, the method determines whether operation of a first light is requested. If 110 is true, the method determines whether the first light has an illumination failure at 114. If not, the method continues normal operation at 118. If 114 is true, the lighting control module 76 determines whether there is an illumination failure with a second light assigned to perform a secondary lighting function at 122. If 122 is false, the method uses the second light to perform the secondary lighting function, notifies the driver, and/or alters control (e.g., brightness, animation, etc.) of the second light at 126. If 122 is true, the lighting control module 76 determines whether there is an illumination failure with a third light assigned to perform the secondary lighting function at 130. If 130 is false, the method uses the third light to perform the secondary lighting function, notifies the driver, and/or alters control (e.g., brightness, animation, etc.) of the third light at 134. If 130 is true, the method reverts to a default failure mode.

Figure 5A:
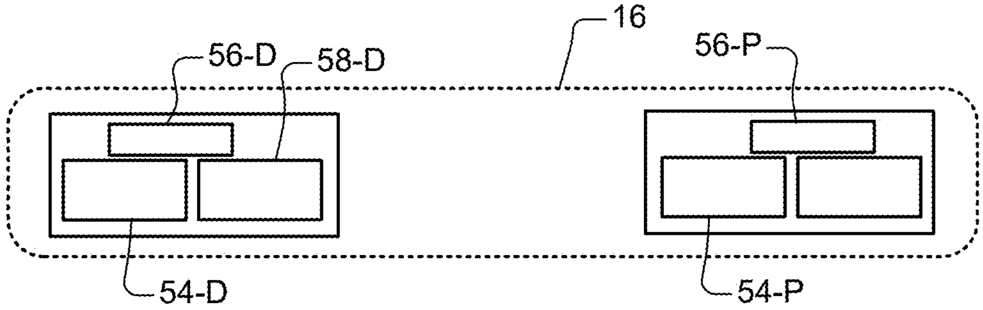
FIGS. 5A to 5C illustrate examples of operation of the rear lighting system in response to a turn signal failure according to the present disclosure.
Figure 5B:
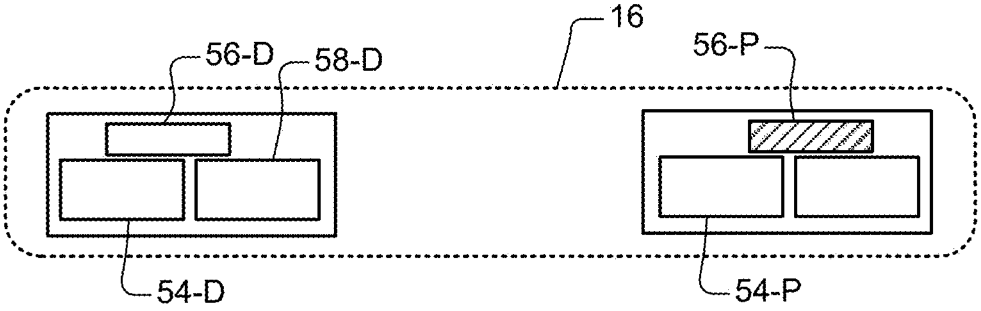
Figure 5C:
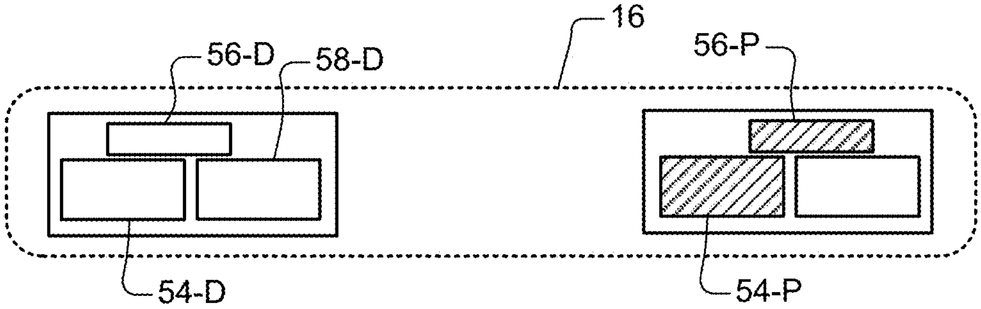

Referring now to FIGS. 5A to 5C, operation of the lighting control module is shown in response to a turn signal light failure. In FIG. 5A, the turn signal light 56-P is underlined to signify an operating turn signal light (e.g., flashing at a predetermine rate). In FIG. 5B, the turn signal light 56-P is not operating (as shown in cross hatches) and the lighting control module 76 adjusts operation to use the brake light 54-P to signal a turn. In this example, the lighting control module 76 flashes the brake light 54-P at a predetermine rate (which can be the same as or different than the turn signal light 56-P). If the brake light 54-P includes a red, green, and blue (RGB) light emitting diode, the color of the brake light 54-P can be changed to yellow when signaling a turn.

In addition, the lighting control module 76 may take one or more additional actions such as notifying the user (in vehicle and/or using a telematics system). Other examples of additional actions that may be taken include adjusting pulse width modulation (PWM) of the brake light 54-P to match the brightness of the turn signal light 56-P. In some examples, the lighting control module 76 alters animation when operating the brake light 54-P as a turn signal.

In FIG. 5C, the turn signal light 56-P and the brake light 54-P are not operating and the lighting control module 76 adjusts operation to use the reverse light 58-P. In this example, the lighting control module 76 flashes the reverse light 58-P at a predetermine rate (which can be the same as or different than the turn signal light 56-P). If the reverse light 58-P includes an RGB LED, the color of the reverse light can be changed to yellow when signaling a turn. In addition, the lighting control module 76 may take one or more additional actions such as notifying the user (in vehicle and/or using a telematics system). Additional actions may be taken such as adjusting the PWM of the brake light 54-P to match the brightness of the turn signal light 56-P. In some examples, the lighting control module 76 alters animation when operating the reverse light 58-P as a turn signal.

If neither of the approaches in FIGS. 5B and 5C are operational, the lighting control module 76 optionally reverts to a standard failure mode such as notifying the user and/or doubling turn signal lights activation frequency.

The vehicle may also need to signal the primary function of the light when supporting the secondary lighting function. In other words, the turn signal light is not operating and the brake light is used to support the secondary lighting function to indicate the turn signal. Then, the vehicle needs to operate the brake light (e.g., the primary lighting function) at the same time. In some examples, the lighting control module 76 cycles between brake and turn signal operation. In some examples, if the brake light includes an RGB LED, the brake light can use different colors such as yellow for turning and red for braking (and/or animation for braking (solid) and turning (flashing)). If the brake light is not an RGB LED, the brake light is operated the same as vehicles where the brake light and the turn signal perform both functions.

Figure 6A:
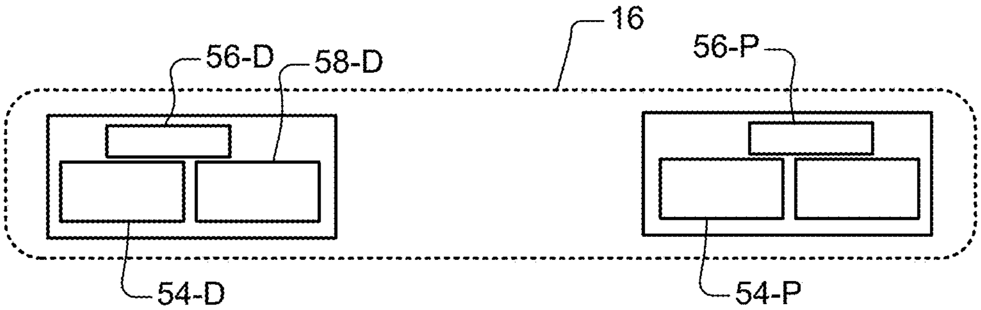
FIGS. 6A to 6C illustrate examples of operation of the rear lighting system in response to a brake light failure according to the present disclosure.
Figure 6B:
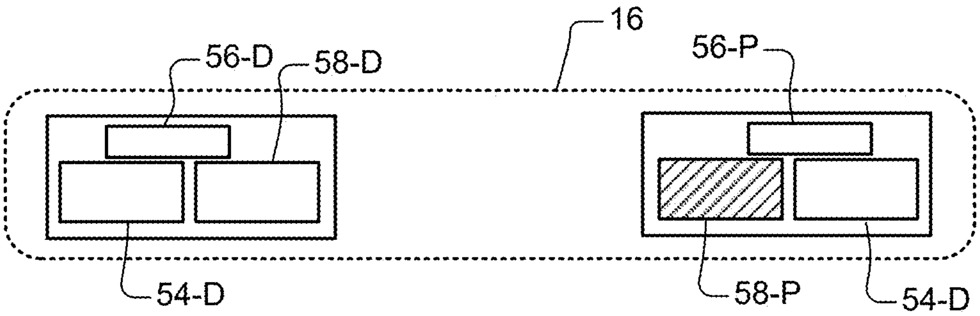
Figure 6C:
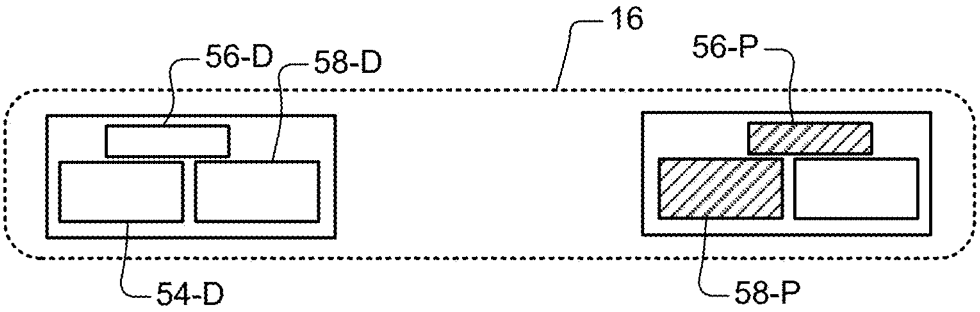

Referring now to FIGS. 6A to 6C, operation of the lighting control module is shown in response to a brake light failure. In FIG. 6A, the brake lights 58-D and 58-P are underlined to signify operating brake lights. In FIG. 6B, the brake light 58-P is not operating (as shown in cross hatches). The lighting control module 76 adjusts operation to use the brake light 58-D and the turn signal lights 56-D and 56-P to signal braking. The asymmetric response of the brake light 58-D and both of the turn signal lights 56-D and 56-P shows the intended function.

In addition, the lighting control module 76 may take one or more additional actions such as notifying the user (in vehicle and/or using a telematics system). Other examples of actions that may be taken include adjusting pulse width modulation (PWM) of the turn signal lights 56-D and 56-P to match the brightness of the brake light 58-P. In some examples, the lighting control module 76 adjusts animation for the backup function.

In FIG. 6C, the brake light 58-P and the turn signal lights 56-D and 56-E are not operating (as shown in cross hatches). The lighting control module 76 adjusts operation to use the brake light 58-D and the reverse lights 54-P and 54-D to signal braking. The asymmetric response of the brake light 58-D and both of the reverse lights 54-P and 54-D shows the intended function.

In addition, the lighting control module 76 may take one or more additional actions such as notifying the user (in vehicle and/or using a telematics system). Other actions that may be taken include adjusting pulse width modulation (PWM) of the reverse lights 54-P and 54-D to match the brightness of the brake light 58-P. In some examples, the lighting control module 76 uses different animation for the secondary function.

Figure 7A:
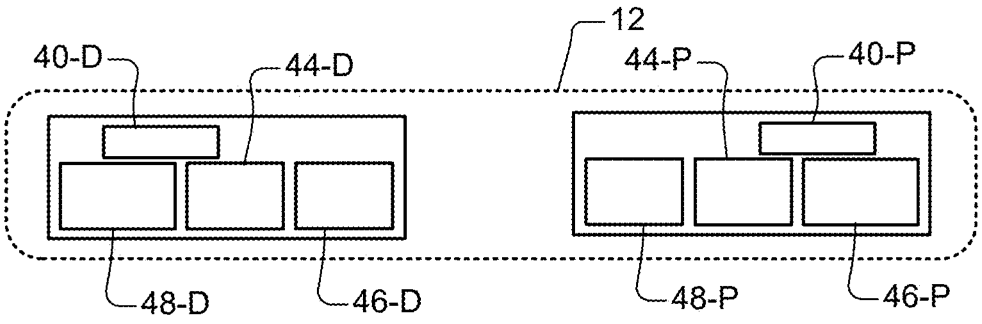
FIGS. 7A to 7C illustrate examples of operation of the front lighting system in response to a high beam failure according to the present disclosure.
Figure 7B:
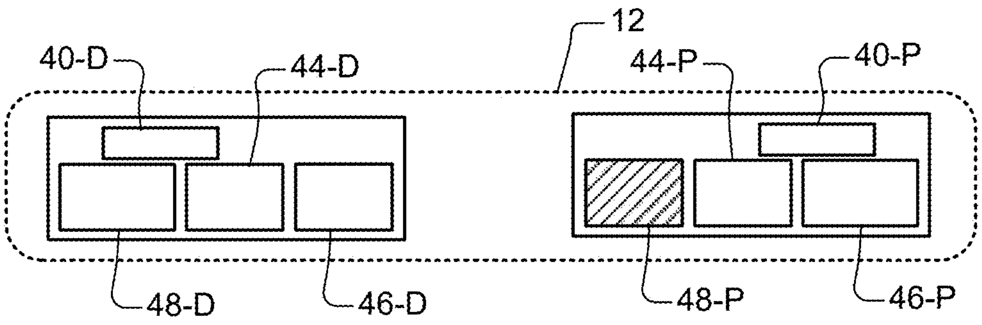
Figure 7C:
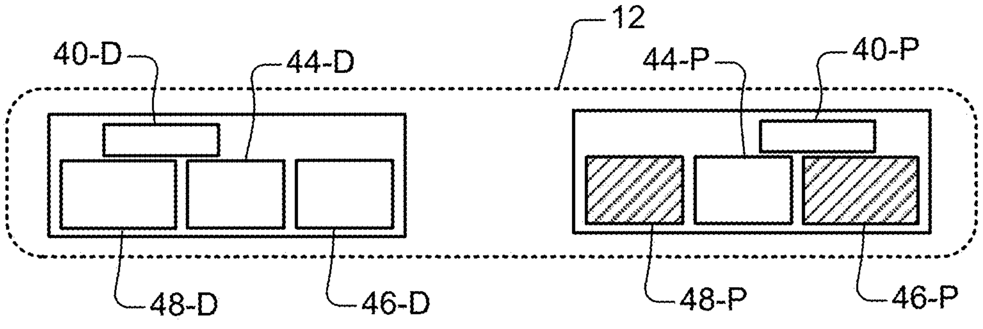

Referring now to FIGS. 7A to 7C, operation of high beams is shown. When the high beams are selected, both the high beams and the low beams are on as shown in FIG. 7A. If the high beam 48-P is not operating, the lighting control module 76 increases the intensity and/or adjusts the height of the low beam 46-P as shown in FIG. 7B to compensate for the illumination failure of the low beam headlight. In some examples, the lighting control module 76 notifies the driver using in vehicle systems and/or a telematics system.

In FIG. 7C, if the high beam 48-P and the low beam 46-P are not operating, the lighting control module 76 illuminates the fog light 44-P to compensate for the illumination failure of the low beam headlight. In some examples, the lighting control module 76 notifies the driver using in vehicle systems and/or a telematics system.

Figure 8A:
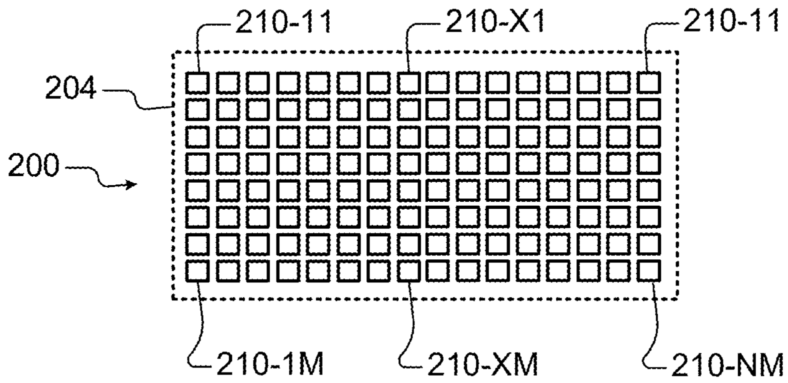
FIGS. 8A and 8B illustrate an example of one of the lights supporting both primary and secondary lighting functions according to the present disclosure.
Figure 8B:
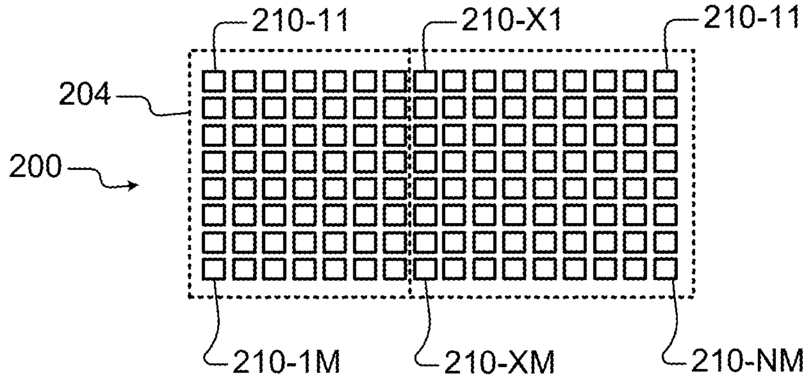

Referring now to FIGS. 8A and 8B, additional examples of a vehicle indicating light 200 such as brake, reverse, and/or turn signals is shown. In FIG. 8A, a light enclosure 204 for the light includes an array 210 including LEDs 210-11 to 210-NM that support the primary function until a secondary function is needed. The LEDs 210-11 to 210-NM can include single color or RGB LEDs, where N and M are integers greater than one. In some examples, the array 210 includes single color LEDs, RGB LEDs, or a combination thereof.

In some examples, when the vehicle indicating light 200 needs to support a secondary function, the array 210 (e.g., 210-11 to 210-XM) can be time multiplexed between the primary function and the secondary functions. In other examples, when the vehicle indicating light 200 needs to support a secondary function, a portion of the array 210 (e.g., 210-11 to 210-XM) continues to be assigned to the primary function and the rest of the array 210 is assigned to a secondary function (or toggles between the primary and secondary functions). In some examples, the portion of the array 210 that continues to support the primary function can be single color LEDs and the rest of the array that supports the primary and secondary functions can be RGB LEDs. In some examples, the primary function may be animated differently than the secondary function. While the array 210 is split horizontally in this example, the array 210 can also be split vertically or in other ways. Furthermore, the portions of the array 210 can be illuminated at the same time or using time multiplexing.

In FIG. 8B, the light enclosure 204 and the array 210 can be split by a light separating member 230. During normal operation, all of the LEDs of the array 210 support the primary function. When the light needs to support a secondary function, the LEDs of the array on one side of the light separating member 230 have a first color and support the primary function while the LEDs of the array 210 on the other side of the light separating member 230 support the primary or secondary function. Separating the areas within the light enclosure 204 allows different color light to be used at the same time. In some examples, the number of LEDs on both sides of the light separating member 230 are the same to provide the same level of illumination when supporting the primary function.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A lighting system for a vehicle, comprising:

at least two indicating lights each supporting a primary lighting function and a secondary lighting function, wherein the at least two indicating lights are selected from a group consisting of a turn signal light, a brake light, and a reverse light;

a diagnostic module configured to determine when a first one of the at least two indicating lights is not operating;

a lighting control module configured to:

control a second one of the at least two indicating lights to support the primary lighting function when the first one of the at least two indicating lights is not operating and the primary lighting function is commanded; and to adjust operation of the second one of the at least two indicating lights to support the secondary lighting function corresponding to the first one of the at least two indicating lights when the first one of the at least two indicating lights is not operating;

a high beam headlight on one of a driver side and a passenger side of the vehicle; and a low beam headlight on the one of the driver side and the passenger side of the vehicle, wherein the diagnostic module is configured to determine when the high beam headlight is not operating, wherein the lighting control module is configured to adjust a height of the low beam headlight to compensate for the high beam headlight when the high beam headlight is not operating.

2. The lighting system of claim 1, wherein the lighting control module is configured to control the second one of the at least two indicating lights to support both the primary lighting function and the secondary lighting function when the primary lighting function is commanded while the first one of the at least two indicating lights is not operating.

3. The lighting system of claim 1, wherein the brake light includes a brake light on the driver side and a brake light on the passenger side, wherein the reverse light includes a reverse light on the driver side and a reverse light on the passenger side, wherein the lighting control module is configured to use the brake light on the driver side and the reverse light on the driver side and the reverse light on the passenger side to signal braking when the brake light on the passenger side is not operating, thereby providing an asymmetric response of the brake light on the driver side and the reverse light on the driver side and the reverse light on the passenger side.

4. The lighting system of claim 3, wherein the at least two indicating lights include red, green, and blue (RGB) light emitting diodes (LEDs), wherein the lighting control module is configured to change a color of the second one of the at least two indicating lights when supporting the secondary lighting function.

5. The lighting system of claim 3, wherein the at least two indicating lights include red, green, and blue (RGB) light emitting diodes (LEDs), wherein the lighting control module is configured to adjust a second color of the second one of the at least two indicating lights to match a first color of the first one of the at least two indicating lights when supporting the secondary lighting function.

6. The lighting system of claim 1, wherein the lighting control module is configured to adjust animation of the second one of the at least two indicating lights when supporting the secondary lighting function.

7. The lighting system of claim 1, wherein the lighting control module is configured to adjust animation of the second one of the at least two indicating lights to match animation of the first one of the at least two indicating lights when supporting the secondary lighting function.

8. The lighting system of claim 1, wherein when the diagnostic module determines that the second one of the at least two indicating lights is also not operating, the lighting control module adjusts operation of a third one of the turn signal light, the brake light, and the reverse light to support the secondary lighting function of the first one of the at least two indicating lights.

9. The lighting system of claim 1, wherein:

the second one of the at least two indicating lights includes an array of light emitting diodes, a first portion of the light emitting diodes is configured to support the primary lighting function, and a second portion of the light emitting diodes is configured to support one of the primary lighting function when the first one of the at least two indicating lights is operating and the secondary lighting function when the first one of the at least two indicating lights is not operating.

10. The lighting system of claim 9, wherein:

the second portion of the light emitting diodes include red, green, and blue (RGB) light emitting diodes (LEDs), and the first portion and the second portion of the light emitting diodes are separated by a light separating member.

11. The lighting system of claim 1, wherein the lighting control module is configured to adjust an intensity of the low beam headlight when the high beam headlight is not operating.

12. The lighting system of claim 11, further comprising:

a fog light on the one of the driver side and the passenger side of the vehicle, wherein the lighting control module is configured to illuminate the fog light when the low beam headlight and the high beam headlight are not operating.

13. A lighting system for a vehicle, comprising:

a turn signal light on one of a driver side and a passenger side of the vehicle;

a brake light on the one of the driver side and the passenger side of the vehicle;

a reverse light on the one of the driver side and the passenger side of the vehicle;

a diagnostic module configured to determine when at least a first one of the turn signal light and the brake light is not operating;

a lighting control module configured to:

control the brake light to support a turn signal lighting function when the turn signal light is not operating;

control the turn signal light to support a brake signal lighting function when the brake light is not operating;

control the reverse light to support the brake signal lighting function when the turn signal light and the brake light are not operating; and control the reverse light to support the turn signal lighting function when the turn signal light and the brake light are not operating;

a first high beam headlight on the driver side of the vehicle;

a second high beam headlight on the passenger side of the vehicle;

a first low beam headlight on the driver side of the vehicle; and a second low beam headlight on the passenger side of the vehicle, wherein diagnostic module configured to determine when at least one of the first high beam headlight and the second high beam headlight is not operating, wherein lighting control module configured to adjust a beam height of one of the first low beam headlight and the second low beam headlight on a same side of the vehicle as the at least one of the first high beam headlight and the second high beam headlight that is not operating.

14. The lighting system of claim 13, wherein the lighting control module is configured to support both a primary lighting function and a secondary lighting function of the turn signal light, the brake light, and the reverse light when the primary lighting function of the turn signal light, the brake light, and the reverse light is needed while the turn signal light, the brake light, and the reverse light are supporting the secondary lighting function.

15. The lighting system of claim 13, wherein the turn signal light, the brake light, and the reverse light include red, green, and blue (RGB) light emitting diodes (LEDs), wherein the lighting control module is configured to change a color of one of the turn signal light, the brake light, and the reverse light when supporting a secondary lighting function.

16. The lighting system of claim 15, wherein the lighting control module is configured to use the brake light on the driver side and the turn signal light on the driver side and the passenger side to signal braking when the brake light on the passenger side is not operating, thereby providing an asymmetric response of the brake light on the driver side and the turn signal light on the driver side and the passenger side.

17. The lighting system of claim 13, wherein the lighting control module is configured to adjust animation of one the turn signal light, the brake light, and the reverse light when supporting a secondary lighting function.

18. The lighting system of claim 13, wherein:

at least one the turn signal light, the brake light, and the reverse light includes an array of light emitting diodes, a first portion of the light emitting diodes is configured to support a primary lighting function, and a second portion of the light emitting diodes is configured to support the primary lighting function or a secondary lighting function.

19. A front lighting system for a vehicle, comprising:

a first high beam headlight on a driver side of the vehicle;

a second high beam headlight on a passenger side of the vehicle;

a first low beam headlight on the driver side of the vehicle;

a second low beam headlight on the passenger side of the vehicle;

a diagnostic module configured to determine when at least one of the first high beam headlight and the second high beam headlight is not operating; and a lighting control module configured to adjust a beam height of one of the first low beam headlight and the second low beam headlight on a same side of the vehicle as the at least one of the first high beam headlight and the second high beam headlight that is not operating to compensate for an illumination failure of the at least one of the first high beam headlight and the second high beam headlight that is not operating.

20. The front lighting system of claim 19, further comprising:

a first fog light on the driver side of the vehicle;

a second fog light on the passenger side of the vehicle; and a telematics system, wherein the lighting control module configured to illuminate at least one of the first fog light and the second fog light on a same side of the vehicle as the at least one of the first high beam headlight and the second high beam headlight when the one of the first low beam headlight and the second low beam headlight is not operating, wherein the lighting control module is configured to adjust an intensity of one of the first low beam headlight and the second low beam headlight on a same side of the vehicle as the at least one of the first high beam headlight and the second high beam headlight that is not operating, wherein the lighting control module is configured to notify a driver of the vehicle via the telematics system when at least one of the first high beam headlight and the second high beam headlight is not operating.

* * * * *